US006438577B1

(12) United States Patent
Owens

(10) Patent No.: US 6,438,577 B1
(45) Date of Patent: Aug. 20, 2002

(54) PORTABLE NETWORKED COMPUTER SYSTEM

(75) Inventor: Myles A. Owens, Spring, TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/345,909

(22) Filed: Jul. 1, 1999

(51) Int. Cl.[7] ............................................... G06F 15/16
(52) U.S. Cl. ...................................... 709/203; 709/220
(58) Field of Search ................................ 709/203, 220; 361/683, 679; 160/135

(56) References Cited

U.S. PATENT DOCUMENTS

| | | | | |
|---|---|---|---|---|
| 5,516,298 A | * | 5/1996 | Smith .......................... | 439/131 |
| 5,519,572 A | * | 5/1996 | Luo ........................... | 360/97.01 |
| 6,154,774 A | * | 11/2000 | Furlong et al. ............. | 709/224 |
| 6,167,664 B1 | * | 1/2001 | Reuter et al. ............... | 160/135 |
| 6,185,110 B1 | * | 2/2001 | Liu ............................ | 361/683 |

* cited by examiner

Primary Examiner—Mehmet B. Geckil
(74) Attorney, Agent, or Firm—Conley, Rose & Tayon, P.C.

(57) ABSTRACT

A self-contained portable networked computer system having integral storage, power and communications for all components of the networked computer system. The networked computer system comprises a network server fabricated within the walls of a carrying case also having compartments for storing portable (clamshell style) workstations and necessary cabling for power and communications to these workstations. The carrying case may be a brief case, a sample case, a suitcase, a metal case, a fiberglass case, a plastic case or any other type of case used for storage and transporting of papers, and/or equipment. The case may be small enough to slide under an airplane seat or be as large as a steamer trunk. The case may be waterproof, bullet proof, airtight, lockable, etc. The case may also be located in a transportation vehicle or a piece of furniture.

37 Claims, 6 Drawing Sheets

PORTABLE NETWORKED COMPUTER SYSTEM

BACKGROUND OF THE INVENTION

1. Field of the Invention

The present invention relates to networked computer systems, and more particularly, to a self-contained portable networked computer system having integral storage, power and communications for all components of the networked computer system.

2. Description of the Related Technology

Use of computers, especially personal computers, is becoming more and more pervasive because the computer has become an integral tool of most information workers who work in the fields of accounting, law, engineering, insurance, services, sales and the like. Rapid technological improvements in the field of computers have opened up many new applications heretofore unavailable or too expensive for the use of older technology mainframe computers. These personal computers may be used as stand-alone workstations (high end individual personal computers) or linked together in a network by a "network server" which is also a personal computer which may have additional features specific to its purpose in the network. The network server may be used to store massive amounts of data, and may facilitate interaction of the individual workstations connected to the network for electronic mail ("e-mail"), document databases, video teleconferencing, whiteboarding, integrated enterprise calendar, virtual engineering design, Internet access and the like.

A significant part of the ever increasing popularity of the personal computer, besides its low cost relative to just a few years ago, is its ability to run sophisticated programs and perform many useful and new tasks. The personal computer thus has become an indispensable part of business, government and the economy. The network server ties together the personal computer workstations into a local area network (LAN), and may be used for storing, sharing and/or forwarding critical information for use by a group of people in a collaborative project, during group meetings, making presentations to customers or clients, during depositions or trial, and the like. This information may comprise for example: databases, word processing, spreadsheets, drawings, graphics, e-mail, pictures, transcripts, exhibits, demonstrative evidence, and the like.

A typical computer system, comprising a server and a plurality of workstations interconnected together by a LAN, requires installation of network cables between the computer workstations and server, or through radio frequency or carrier current means. Setup of this type of computer system involves placing individual hardware components where needed, supplying power to each component, and establishing communications between the components of the networked computer system. These components may require special configuration or have differing physical operating requirements in order to function together. Ad hoc installation of various components of the networked computer system requires skilled technicians, special tools, and good preplanning or a ready source for needed items to get the networked computer system operational. Thus, rapid setup for temporary, portable, or emergency networked computer system applications may be difficult or even impossible.

What is needed is a system, method and apparatus for easily and quickly setting up an operational networked computer system without having to custom wire circuits for power and/or communications, and without the problem of not having critical components necessary to make the computer system fully functional.

SUMMARY OF THE INVENTION

The present invention overcomes the above-identified problems as well as other shortcomings and deficiencies of existing technologies by providing a portable networked computer system that is easily transportable, is completely self-contained and may be set-up anywhere without special tools, custom facilities or technical personal. An embodiment of the invention comprises a network server fabricated within the walls of a carrying case also having a compartment(s) for storing portable (clamshell style) workstations and necessary cabling for power and communications to these workstations. The carrying case may be a brief case, a sample case or a suitcase made of metal, fiberglass, plastic, nylon, graphite composites, or any other type of case and material that may be used for storage and transporting of papers, and/or equipment. Handles, wheels, collapsible rods, etc., may be used as an aid in carrying and/or moving the carrying case. The case may be small enough to slide under an airplane seat or be as large as a steamer trunk. The case may be waterproof, bullet proof, airtight, lockable and the like. Compartments for storage may be included on the inside and the outside of the case.

An analog or digital telephone connection, either hardwired telephone lines or wireless cellular, satellite or the like, may be used in conjunction with a built-in modem, router, or switch for connection to the Internet or private line wide area networks (WAN). The workstations may be simple to complex, e.g., from a personal digital assistant (PDA), thin client or network computer (NC) to a fully implemented personal computer (PC), or any combination thereof. It is contemplated and within the scope of the invention that the workstations may also comprise voice recognition and speech output. The network server may be built into the top, bottom and/or side walls of the carrying case. Batteries may also be incorporated into the case as well as a battery charger. The battery charger inside of a wall of the case may also be used to charge the batteries of the clamshell style portable workstations. Insertion of the closed clamshell workstation into the case may also engage power connections for charging a battery in each of the clamshell workstations.

The embodiment of the invention may be easily and quickly transported to any location as needed, set up and be ready to use in a matter of minutes. Another embodiment of the invention utilizes a battery powered server, battery powered workstations, and infrared or radio frequency communications for wireless operation of the networked computer system. This is especially beneficial in emergency and guest environments. Emergency environments may be for example but not limitation: disaster management such as Red Cross, Civil Defense, FEMA and the like; military battlefield command post, police or fire command post, riot control, immigration control; customs inspections of goods entering a country, and road blocks and/or manhunts for escaped prisoners. Guest environments may be for example but not limitation: depositions, court trials, sales presentations, seminars and lectures, conventions, expositions, trade shows, board meetings, temporary office, group meetings in conference rooms at an office or a hotel, financial audits by visiting auditors, store or warehouse inventory audits; group networking on an airplane, bus, train or automobile, and the like.

Another embodiment of the invention may be integrated into public or private transportation such as, for example but not limitation: an airplane, train, subway, boat, bus, automobile, truck, spaceship, balloon, space station, submarine, and the like (hereinafter "transportation vehicle"). More and more information workers use and require a networked computer system to perform their jobs. Companies are utilizing Intranets in the office and Extranets to enable workers to telecommute from home or a remote office, however, the worker may be cutoff from the company's Extranet when commuting between the home and office, or between cities or countries. Valuable time may be wasted, or contact with key decision makers lost when the worker is not connected to the company's Intranet or Extranet. Workers may take portable computers with them to do off line work and to then later connect to the company's network, or through a cellular or satellite telephone link which can be used while the worker is being transported. Problems exist however, when private communications is attempted in public transportation. FAA regulations prohibit the use of uncertified radio frequency generating equipment which may interfere with an airplane's navigational and landing systems, or private communications may not function reliably in a boat or a train.

An embodiment of the invention may be installed in the public or private transportation vehicle, with communications access to the Internet optimized for the route thereof. Portable workstations may be provided on a rental or lease basis, and the traveling workers can access their company websites (portal to the company network) through the Internet. Advantages of this embodiment of the invention are: 1) the worker does not have to supply and carry a privately owned portable workstation, and 2) Internet communications is more reliable since the communications connection has been optimally engineered for the route of the transportation vehicle.

The carrying case of the network server may be designed to fit into a storage compartment of the transportation vehicle, or the network server may be built into a compartment of the transportation vehicle specifically designed therefor. The portable workstations are stored and charged in the server case or compartment of the transportation vehicle. It is also contemplated and within the scope of the invention that an embodiment of the invention may be integrated into office or home furniture such as, for example but not limitation: a desk, conference room table, cabinet, credenza and the like. The network server may be built into a pedestal and the like of the furniture and the workstations may be integrated into the work surface of the furniture. Intranet and Internet communications may be provided to the server of the invention for use by the workstations, as more fully described herein.

The embodiments of the invention may also be integrated with other existing networked computer systems such as a fixed installation LAN, a wide area network (WAN), and/or a storage area network (SAN). The embodiments of the invention may be used to supplement an existing networked computer system for additional or temporary employees, as an emergency backup system, or as a temporary networked computer system during a main networked computer system upgrade, repair or replacement.

A feature of the invention is storage of the workstations and cables within the server/case.

Another feature is easy transportation of an entire networked computer system.

Still another feature is rapid deployment of a networked computer system anywhere.

Another feature is independence of the need for external power or special communications wiring.

Another feature is charging workstations while they are stored and protected in the case.

Still another feature is access to the Internet for all workstations operating therewith.

An advantage of the invention is being able to use the networked computer system anywhere without needing power or special communications wiring.

Another advantage is security and control of unauthorized access.

Another advantage is low cost of the networked computer system and ease of setup and use thereof.

Another advantage is computer and Internet access for public commuters.

Other and further embodiments, features and advantages will be apparent from the following description of presently preferred embodiments of the invention, given for the purpose of disclosure and taken in conjunction with the accompanying drawings.

DETAILED DESCRIPTION OF THE PREFERRED EMBODIMENT

Figure 1:
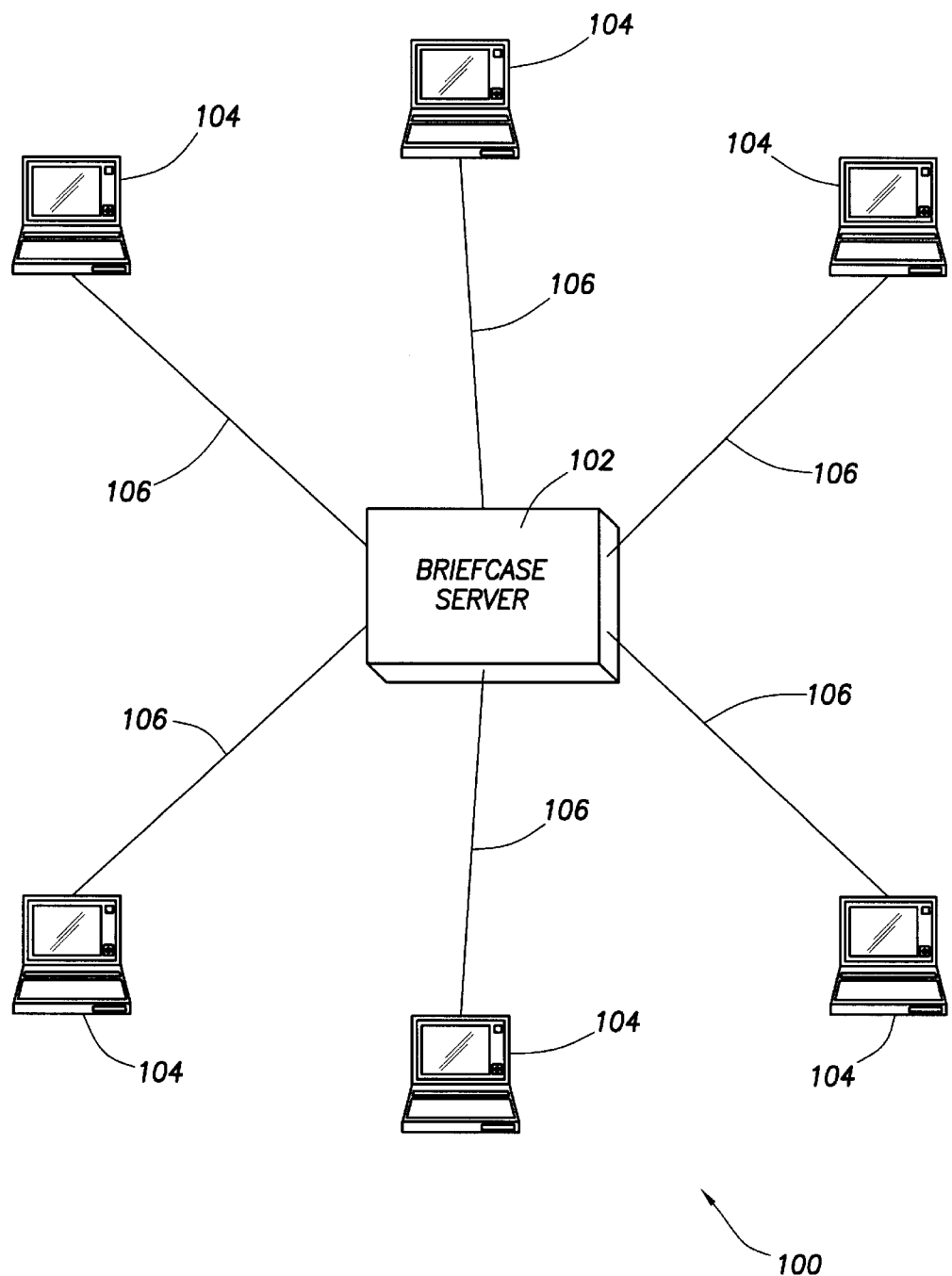
FIG. 1 is a schematic block diagram of a wired networked computer system according to an embodiment of the present invention.

The present invention is a system, method and apparatus which provides a portable networked computer system that is easily transportable, is completely self-contained and may be set-up anywhere without special tools, custom facilities or technical personal.

For illustrative purposes, preferred embodiments of the present invention are described hereinafter for computer systems utilizing the Intel x86 microprocessor architecture and certain terms and references will be specific to that processor platform. It will be appreciated by those skilled in the art of computer systems that the present invention may be adapted and applied to any computer platform.

Referring now to the drawings, the details of preferred embodiments of the present invention are schematically illustrated. Like elements in the drawings will be represented by like numbers, and similar elements will be represented by like numbers with a different lower case letter suffix.

Figure 2:
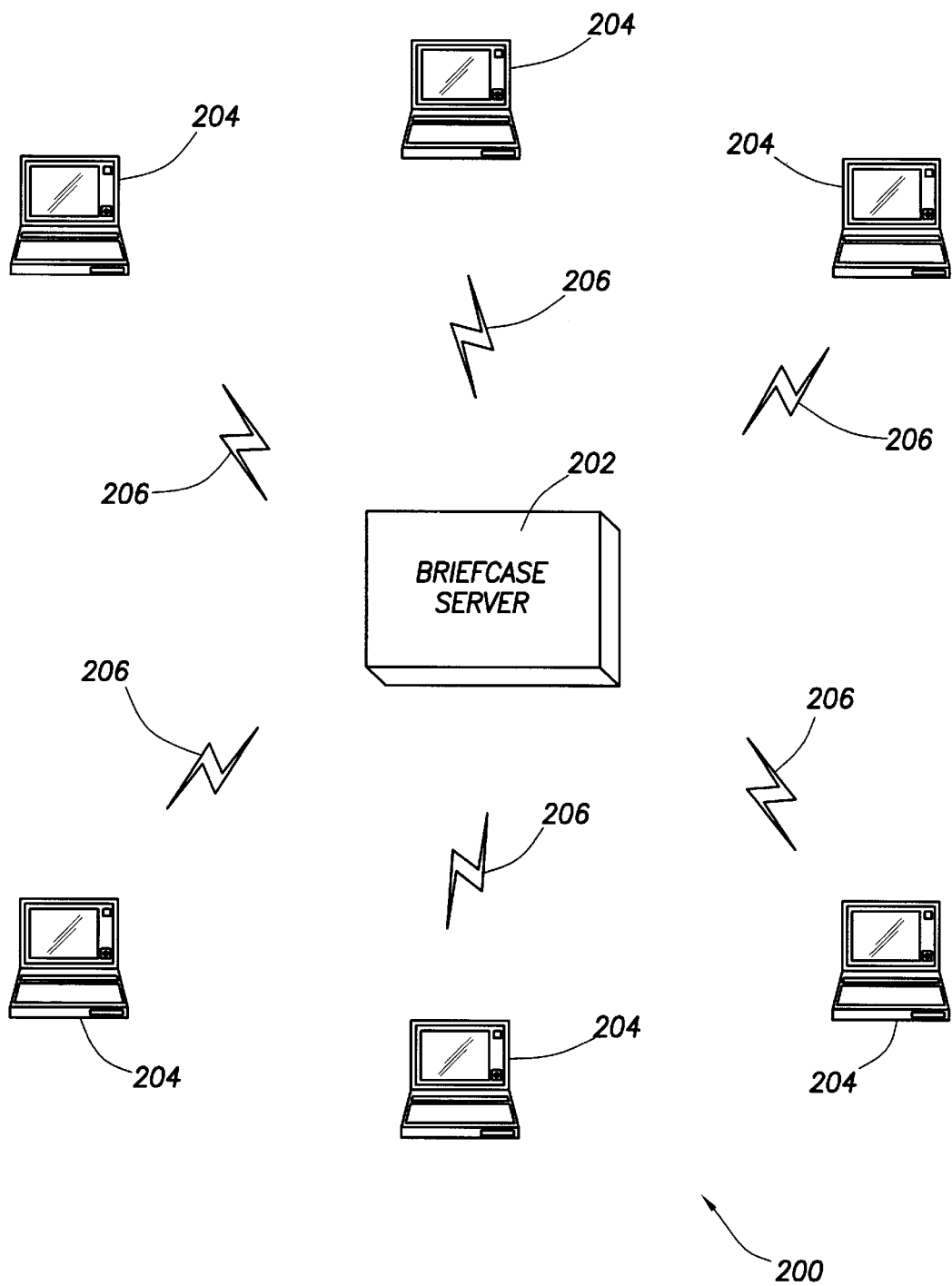
FIG. 2 is a schematic block diagram of a wireless networked computer system according to another embodiment of the present invention.

Referring now to FIG. 1, a schematic block diagram of a wired networked computer system according to an embodiment of the invention is illustrated. The networked computer system is generally indicated by the numeral 100 and comprises a briefcase computer server 102, a plurality of networked workstations 104, and interconnection cables 106. The interconnection cables 106 may be used for communications such as Ethernet, USB, and the like, between the server 102 and the plurality of workstations 104. The cables 106 may be for example, twisted copper wire pairs, fiber optic cables, coaxial cables, and the like. The cables 106 may also include power cables for supplying power from the server 102 to the workstations 104. A printer and/or telephone line (not illustrated) may also be connected to the server 102 for use by any of the workstations 104. The networked computer system 100 represents a completely functional and operation computer system which may be easily and quickly setup anywhere by unskilled personnel. Referring to FIG. 2, a schematic block diagram of a wireless networked computer system according to another embodiment of the invention is illustrated. The wireless networked computer system is generally indicated by the numeral 200 and comprises a briefcase computer server 202 and a plurality of wireless networked workstations 204. Each of the workstations 204 may be a clamshell style laptop computer having built-in batter power and a wireless modem for communicating with the server 202. The wireless modem may operate, for example but not limitation, at infrared wavelengths, radio frequencies such as very high frequency (VHF), ultra high frequency (UHF) and microwaves; and the like. Frequency modulation (FM), pulse code modulation (PCM), and the like on fixed frequency channels, or spread spectrum may be used for communications in this embodiment. The wireless medium of communications is represented generally by the numeral 206. Wireless communication between the server 202 and the workstations 204 allows easier, quicker and more flexible setup that the hardwired embodiment of FIG. 1, however, security and interference issues are more pronounced with the embodiment illustrated in FIG. 2. Encryption, and error checking and correction of the data between the server 202 and the workstations 204 makes this wireless embodiment quite feasible and cost effective. A printer (not illustrated) may also be connected to the server 202 for use by any of the workstations 204.

Figure 3:
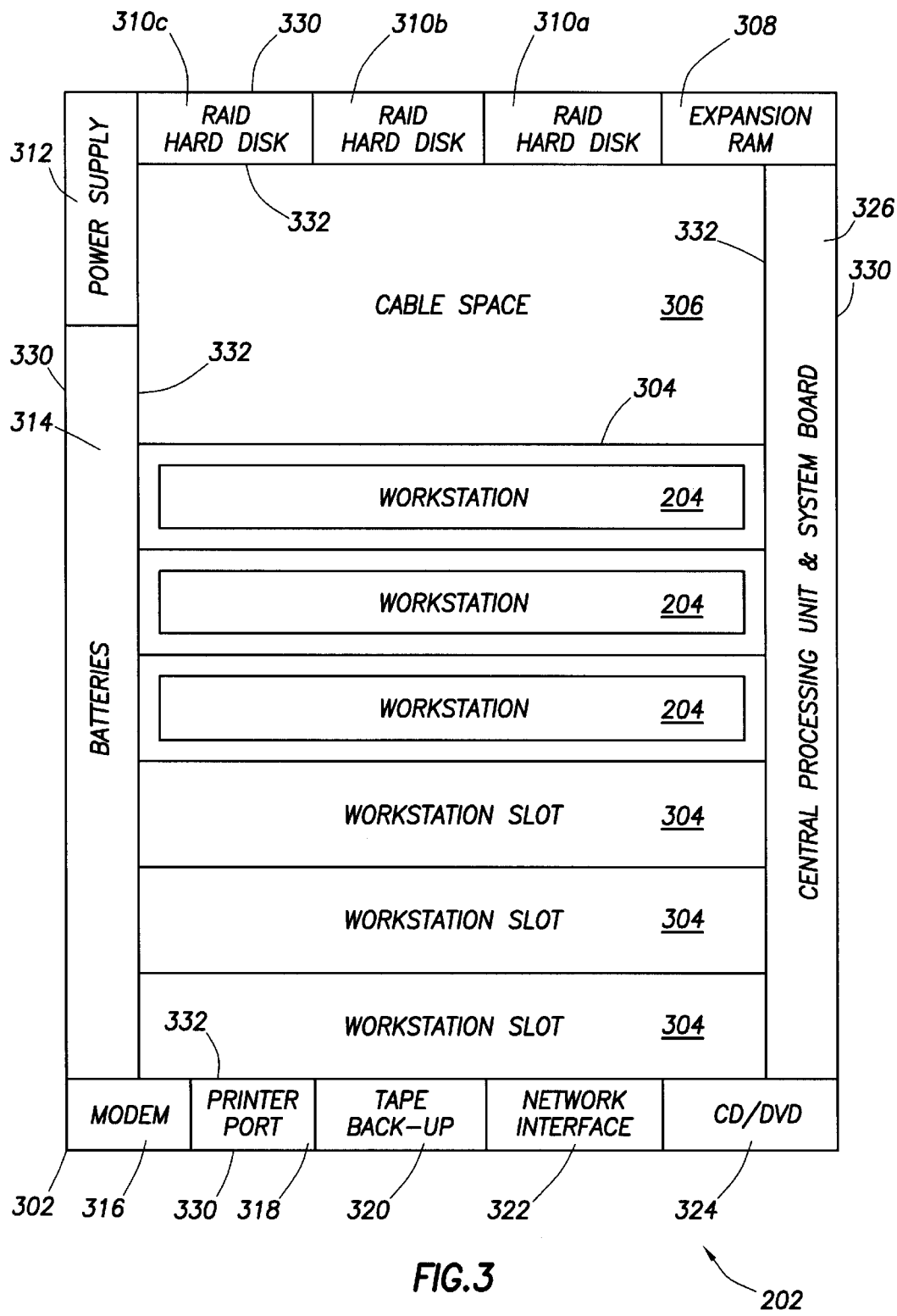
FIG. 3 is a schematic block diagram plan view of the briefcase server illustrated in FIGS. 1 and 2.

Referring now to FIG. 3, a schematic block diagram plan view of the briefcase servers 102 and 202 of FIGS. 1 and 2, respectively, is illustrated. The briefcase servers 102 and 202 comprise a case 302 having exterior walls 330 and interior walls 332. Sandwiched between the interior walls 332 and the exterior walls 330 are the components necessary for a full function network server. Within the interior walls 332 are compartments comprising workstation slots 304, a cable space 306, and workstation slots 304. The briefcase servers 102 and 202 may be made of any material(s) typically used for high quality brief cases, luggage, reusable shipping containers and the like. It is contemplated and within the scope of the invention that the size, shape and materials used for construction of the case 302 only be dictated by the intended use of the embodiments of the networked computer systems described herein. Handles, wheels, collapsible rods, etc. (not illustrated) may be used as an aid in carrying and/or moving the carrying case.

The electronic components for the briefcase servers 102 and 202 may comprise a central processing unit and system board 326, expansion random access memory (RAM) 308, RAID hard disks 310a, 310b and 310c; a power supply 312, batteries 314 (optional depending upon configuration and use), a modem 316, a printer port 318, tape back-up 320, a network interface 322, and a CD and/or DVD 324. The aforementioned electronic components make up a state of the art server in a compact and portable package. The modem 316 may comprise a radio frequency modem used in conjunction with a cellular, microwave, VHF, UHF, spread spectrum, satellite, and the like as a wireless telephone which may be used to connect to other WAN or Internet systems.

The workstation slots 304 are adapted for storing the workstations 104 and 204, and the cable space 306 is adapted for storing the cables 106. A network hub or switch (not illustrated) may also be stored in the briefcase servers 102 and 202. Workstation slots 304 may have adapters 354 (FIG. 3A) for connecting to the workstations 204 (and 104 if battery powered) when the workstations 204 are inserted into the workstation slots 304. This enables the power supply 312 (or a separate battery charger supply) to charge the workstation 204 batteries. Power for charging the workstation 204 batteries may also come from the batteries 314. The briefcase server 102 may connect to an external power source and the briefcase server 202 may either be powered from the external power source or run from its internal batteries 314. The workstations 104 may be powered from the server 102. The workstations 204 have internal battery power or may be powered by a self-contained power supply (not illustrated) connected to a power receptacle. Every component which is required to complete the networked computer systems 100 and 200 may be stored or contained within the server case 302, and be readily transported where needed.

Figure 3A:
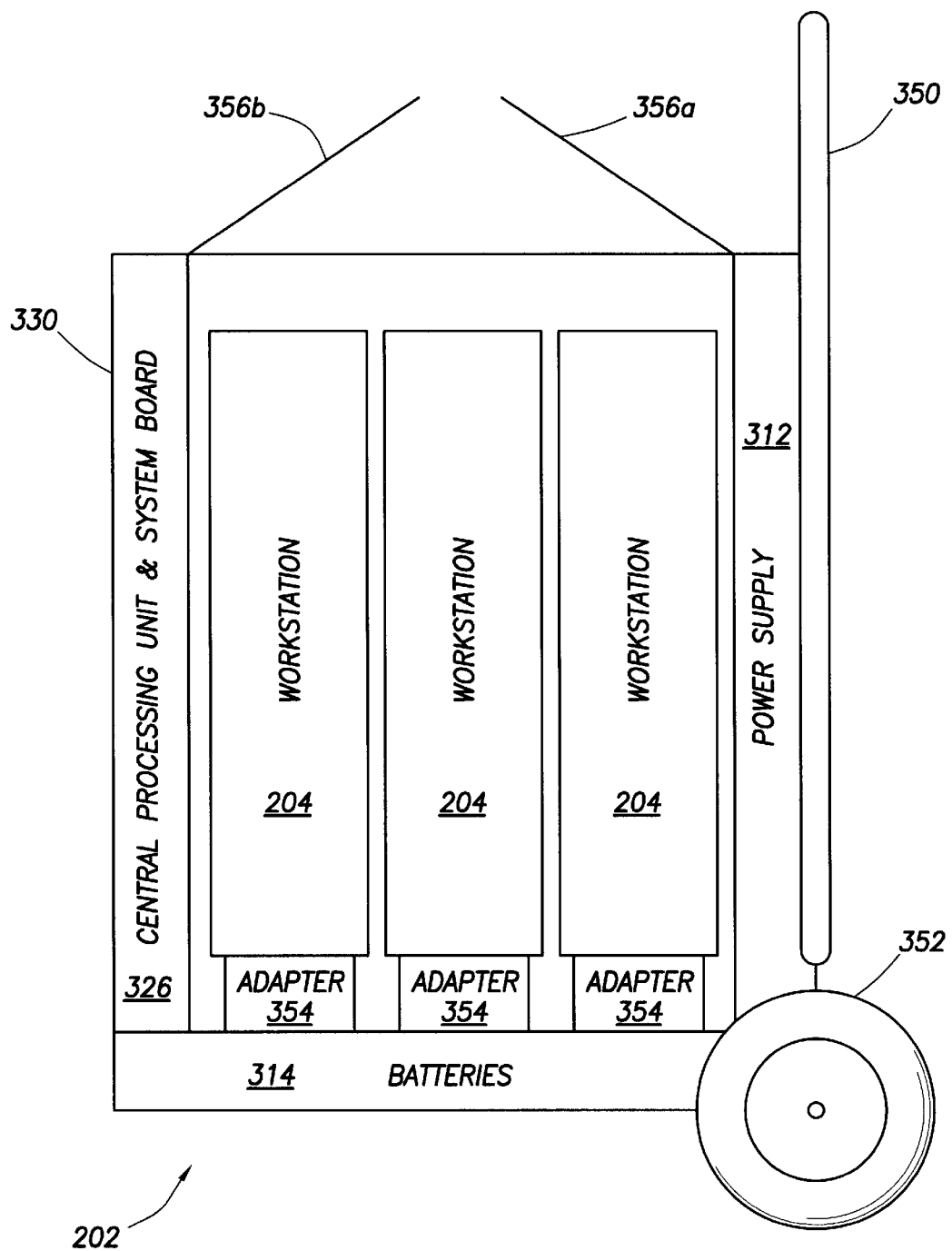
FIG. 3A is a schematic block diagram elevational view of the briefcase server illustrated in FIGS. 1 and 2.

Referring to FIG. 3A, a schematic block diagram elevational view of the briefcase servers 102 and 202 of FIGS. 1 and 2, respectively, is illustrated. A telescoping carrying handle 350 and wheels 352 may be attached to the server case 302 for ease in transportation. A radio frequency antenna (not illustrated) for cellular, satellite, or spread spectrum radio frequency communications may be integral with, attached to, or separate from the handle 350. Batteries 314 may be located in the bottom portion of the server case 302. Adapters 354 may be used to connect the workstations 204 to the power supply 312 for charging the workstation 204 batteries. A top cover comprising top flaps 356a and 356b may be used to close off and lock in the contents of the server case 302 for transportation purposes.

Figure 5:
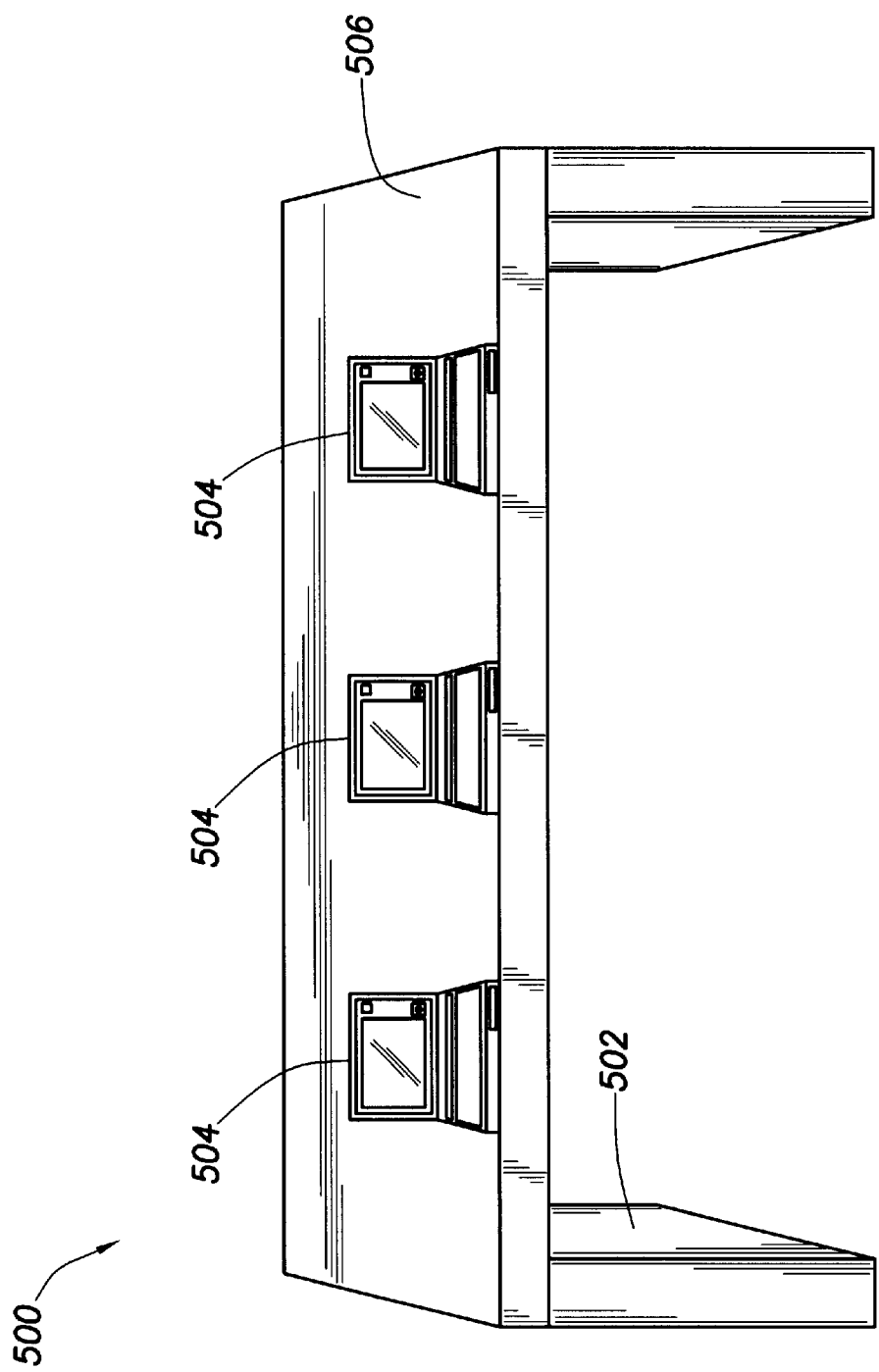
FIG. 5 is a schematic elevational view of another embodiment of the invention integrated into a piece of furniture.

Referring to FIG. 5, a schematic cross section elevational view of an embodiment of the invention built into a conference room table is illustrated. The networked computer system is generally indicated by the numeral 500 and comprises a pedestal computer server 502, a plurality of networked workstations 504 built into a table top 506, and interconnection cables (not illustrated). The pedestal computer server 502 may comprise the aforementioned components and also be connected to a larger LAN, WAN, Intranet and Internet as disclosed hereinabove. The workstations 504 may be folded closed into the desktop 506 when not in use. Thus, the desktop 506 may be used as a regular desk top surface when the workstations 504 are not being utilized.

The briefcase server 202 illustrated in FIG. 3 may be built into a storage compartment of an airplane, train (including subway), boat, bus, automobile, truck, spaceship, balloon, space station, submarine, or other mode of public or private transportation, and the workstations 204 may be distributed throughout the airplane, train, bus, ship, etc., for use by travelers doing office work during their journey. The travelers may use the Internet through the workstations 204, and the Internet connection can be provided through the server by using a wireless telephone connection such as, for example but not limitation, cellular, satellite, spread spectrum, microwave and the like.

Figure 4:
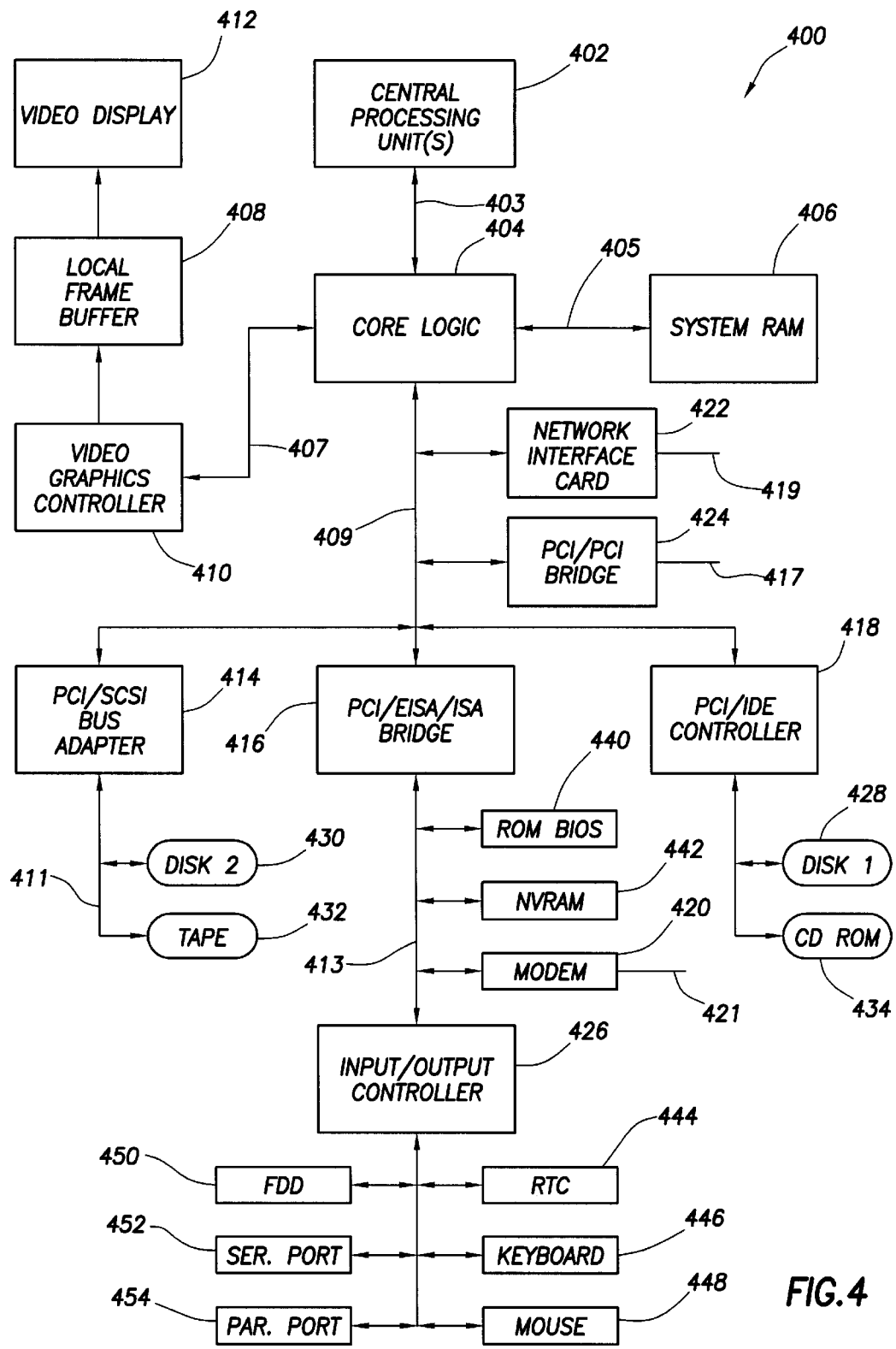
FIG. 4 is a schematic block diagram of a computer system according to the embodiments of the invention.

Referring to FIG. 4, a schematic block diagram, generally, of the workstations 104 and 204 and the servers 102 and 202 is illustrated. A typical computer system is generally indicated by the numeral 400 and comprises a central processing unit(s) (CPU) 402, core logic 404, system random access memory ("RAM") 406, a video graphics controller 410, a local frame buffer 408, a video display 412, a PCI/SCSI bus adapter 414, a PCI/EISA/ISA bridge 416, and a PCI/IDE controller 418. Single or multilevel cache memory (not illustrated) may also be included in the computer system 400 according to the current art of microprocessor computer systems. The CPU 402 may be a plurality of CPUs 402 in a symmetric or asymmetric multi-processor configuration. The video graphics controller 410 may be an AGP device (illustrated) connected to an AGP bus 407 or a PCI device (not illustrated) connected to the PCI bus 409.

The CPU(s) 402 is connected to the core logic 404 through a host bus 403. The system RAM 406 is connected to the core logic 404 through a memory bus 405. The video graphics controller 410 is illustrated connected to the core logic 404 through the AGP bus 407. The PCI/SCSI bus adapter 414, PCI/EISA/ISA bridge 416, and PCI/IDE controller 418 are connected to the core logic 404 through a PCI bus 409. Also connected to the PCI bus 409 are a network interface card ("NIC") 422 and a PCI/PCI bridge 424. Some of the PCI devices such as the NIC 422 and PCI/PCI bridge 424 may plug into PCI connectors on the computer system 400 motherboard 300 (see FIG. 3).

Hard disk 430 and tape drive 432 may be connected to the PCI/SCSI bus adapter 414 through a SCSI bus 411. The NIC 422 is connected to a local area network 419. The PCI/EISA/ISA bridge 416 connects over an EISA/ISA bus 413 to a ROM BIOS 440, non-volatile random access memory (NVRAM) 442, modem 420, and input-output controller 426. The modem 420 connects to a telephone line 421. The input-output controller 426 interfaces with a keyboard 446, real time clock (RTC) 444, mouse 448, floppy disk drive ("FDD") 450, a serial port 452, and a parallel port 454. The EISA/ISA bus 413 is a slower information bus than the PCI bus 409, but it costs less to interface with the EISA/ISA bus 413. The PCI/IDE controller 418 interfaces hard disk 428 and CD ROM drive 434 to the PCI bus 409.

The present invention, therefore, is well adapted to carry out the objects and attain the ends and advantages mentioned, as well as others inherent therein. While the present invention has been depicted, described, and is defined by reference to particular preferred embodiments of the invention, such references do not imply a limitation on the invention, and no such limitation is to be inferred. The invention is capable of considerable modification, alternation, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A networked computer system, comprising:
a portable case comprising inner and outer walls, the inner and outer walls having inner and outer faces, wherein the inner faces of the outer walls are facing the outer faces of the inner walls;
the inner faces of the outer walls and the outer faces of the inner walls are adapted for locating computer components therebetween;
the computer components being configured as a computer network server, the computer components disposed between the inner and outer faces of the outer and inner walls, respectively, of the portable case; and
a plurality of workstation compartments, each of the plurality of workstation compartments adapted for storing a workstation, wherein the plurality of workstation compartments are disposed between the inner faces of the inner walls of the portable case.

2. The networked computer system of claim 1, further comprising a plurality of workstations.

3. The networked computer system of claim 2, wherein the workstation is a portable personal computer.

4. The networked computer system of claim 2, wherein the workstation has a self-contained battery for a power source.

5. The networked computer system of claim 2, further comprising at least one cable compartment for storing a plurality of cables, the cables being used for connecting the computer network server to the plurality of workstations.

6. The networked computer system of claim 5, further comprising a network hub for interconnecting the plurality of cables to the computer network server.

7. The networked computer system of claim 4, further comprising a battery charging circuit in each of the plurality of workstation compartments, the battery charging circuit adapted for charging the battery of the workstation.

8. The networked computer system of claim 7, wherein the battery charging circuit connects to the workstation when the workstation is placed in the workstation compartment.

9. The networked computer system of claim 1, wherein the computer components are selected from the group consisting of at least one central processing unit, random access memory, bus interface controllers, hard disks, compact disk (CD), floppy disk, network interface, modem, battery, battery charger, video interface, tape drive and power supply.

10. The networked computer system of claim 1, further comprising a handle on the portable case for ease in transportation.

11. The networked computer system of claim 1, further comprising wheels on the portable case for ease in transportation.

12. The networked computer system of claim 1, wherein the portable case fits under an airplane seat.

13. The networked computer system of claim 1, wherein the portable case is made from materials selected from the group consisting of metal, plastic, leather, nylon and graphite composites.

14. The networked computer system of claim 1, further comprising a wireless communications system for communicating with another computer network.

15. The networked computer system of claim 14, wherein the wireless communications system is selected from the group consisting of cellular, satellite and spread-spectrum at radio frequencies; and infrared.

16. The networked computer system of claim 14, wherein an antenna for the wireless communications system is integral with the portable case.

17. A networked computer system, comprising:
a case comprising inner and outer walls, the inner and outer walls having inner and outer faces, wherein the inner faces of the outer walls are facing the outer faces of the inner walls;
the inner faces of the outer walls and the outer faces of the inner walls are adapted for locating computer components therebetween;
the computer components being configured as a computer network server, the computer components disposed between the inner and outer faces of the outer and inner walls, respectively, of the case; and
a plurality of workstation compartments, each of the plurality of workstation compartments adapted for storing a workstation, wherein the plurality of workstation compartments are disposed between the inner faces of the inner walls of the case.

18. The networked computer system of claim 17, wherein the case is in a transportation vehicle.

19. The networked computer system of claim 18, wherein the transportation vehicle is selected from the group consisting of an airplane, train, boat, bus, automobile, truck, spaceship, balloon, space station and submarine.

20. The networked computer system of claim 18, further comprising a wireless communications system for communicating with another computer network.

21. The networked computer system of claim 20, wherein the wireless communications system is selected from the group consisting of cellular, satellite and spread-spectrum at radio frequencies; and infrared.

22. A networked computer system, comprising:
a case comprising inner and outer walls, the inner and outer walls having inner and outer faces, wherein the inner faces of the outer walls are facing the outer faces of the inner walls;
the inner faces of the outer walls and the outer faces of the inner walls are adapted for locating computer components therebetween;
the computer components being configured as a computer network server, the computer components disposed between the inner and outer faces of the outer and inner walls, respectively, of the case;
a plurality of workstation compartments, each of the plurality of workstation compartments adapted for storing a workstation, wherein the plurality of workstation compartments are disposed between the inner faces of the inner walls of the case; and
a piece of furniture having the case as an integral part of the piece of furniture.

23. The networked computer system of claim 22, wherein the piece of furniture is selected from the group consisting of a desk, table, credenza, cabinet, sofa and chair.

24. A method, in a networked computer system, comprising the steps of:
providing a case having inner and outer walls, the inner and outer walls having inner and outer faces, wherein the inner faces of the outer walls are facing the outer faces of the inner walls;
locating computer components between the inner faces of the outer walls and the outer faces of the inner walls;
configuring the computer components as a computer network server, the computer components being disposed between the inner and outer faces of the outer and inner walls, respectively, of the case; and
providing a plurality of workstation compartments, each of the plurality of workstation compartments adapted for storing a workstation, wherein the plurality of workstation compartments are disposed between the inner faces of the inner walls of the case.

25. The method of claim 24, further comprising the step of providing a plurality of workstations.

26. The method of claim 25, wherein the plurality of workstations are a plurality of portable personal computers.

27. The method of claim 25, further comprising the step of providing at least one cable compartment for storing a plurality of cables, the cables being used for connecting the computer network server to the plurality of workstations.

28. The method of claim 24, further comprising the step of providing a network hub for interconnecting the plurality of cables to the computer network server.

29. The method of claim 25, further comprising the step of providing a battery charging circuit in each of the plurality of workstation compartments, the battery charging circuit adapted for charging a battery of the workstation.

30. The method of claim 29, further comprising the step of connecting the workstation to the battery charging circuit when the workstation is placed in the workstation compartment.

31. The method of claim 24, wherein the case is portable.

32. The method of claim 31, wherein the portable case has wheels and a carrying handle.

33. The method of claim 24, wherein the case is in a transportation vehicle, and the transportation vehicle is selected from the group consisting of an airplane, train, subway, boat, bus, automobile, truck, spaceship, balloon, space station and submarine.

34. The method of claim 24, wherein the case is an integral part of a piece of furniture, and the piece of furniture is selected from the group consisting of a desk, table, credenza, cabinet, sofa and chair.

35. The method of claim 24, further comprising the step of communicating with another computer network.

36. The method of claim 35, wherein the step of communicating with another computer network is by wireless communications.

37. The method of claim 36, where the step of communicating by wireless communications is selected from the group consisting of cellular, satellite and spread-spectrum at radio frequencies; and infrared.

* * * * *